United States Patent
Park et al.

(10) Patent No.: US 10,095,272 B2
(45) Date of Patent: Oct. 9, 2018

(54) FLEXIBLE DISPLAY DEVICE

(71) Applicant: SAMSUNG DISPLAY CO., LTD., Yongin-si, Gyeonggi-do (KR)

(72) Inventors: Ju-Chan Park, Seoul (KR); Jin-Taek Kim, Suwon-si (KR); Tae-An Seo, Hwaseong-si (KR); Sun-Hee Lee, Hwaseong-si (KR); Pil-Suk Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 102 days.

(21) Appl. No.: 15/094,666

(22) Filed: Apr. 8, 2016

(65) Prior Publication Data

US 2017/0115699 A1 Apr. 27, 2017

(30) Foreign Application Priority Data

Oct. 22, 2015 (KR) ........................ 10-2015-0147299

(51) Int. Cl.
*G06F 1/16* (2006.01)
*G09G 3/36* (2006.01)
(52) U.S. Cl.
CPC .......... *G06F 1/1652* (2013.01); *G09G 3/3611* (2013.01); *G09G 2380/02* (2013.01)
(58) Field of Classification Search
CPC . G09G 3/3611; G09G 2380/02; G06F 1/1652
See application file for complete search history.

(56) References Cited

U.S. PATENT DOCUMENTS

| 2003/0227262 | A1* | 12/2003 | Kwon ..................... G09G 3/325 315/169.3 |
| 2012/0194773 | A1* | 8/2012 | Kim ..................... G02F 1/13336 349/139 |
| 2015/0287365 | A1* | 10/2015 | Song ..................... G09G 3/344 345/206 |
| 2015/0364396 | A1* | 12/2015 | Asai ..................... G02F 1/13336 257/43 |
| 2016/0284272 | A1* | 9/2016 | Her ..................... G09G 3/3233 |
| 2017/0031389 | A1* | 2/2017 | Yoo ..................... G06F 1/1652 |

FOREIGN PATENT DOCUMENTS

KR 10-2013-0127050 A 11/2013

* cited by examiner

*Primary Examiner* — Liliana Cerullo
(74) *Attorney, Agent, or Firm* — Lewis Roca Rothgerber Christie LLP

(57) ABSTRACT

A flexible display device includes a display panel including a main display area including a plurality of main pixel rows, and a sub display area at a side of the main display area and including a plurality of sub pixel rows, a scan driving circuit configured to provide scan signals to the main pixel rows via a plurality of main scan lines, and provide the scan signals to the sub pixel rows via a plurality of sub scan lines, a data driving circuit configured to provide data signals to a plurality of pixels respectively located in the main pixel rows and the sub pixel rows, and a timing controller configured to control the scan driving circuit and the data driving circuit, wherein a number of the sub pixel rows is less than a number of the main pixel rows.

13 Claims, 10 Drawing Sheets

FLEXIBLE DISPLAY DEVICE

CROSS REFERENCE TO RELATED APPLICATION

This application claims priority to, and the benefit of, Korean Patent Application No. 10-2015-0147299, filed on Oct. 22, 2015 in the Korean Intellectual Property Office (KIPO), the entire content of which is herein incorporated by reference.

BACKGROUND

1. Field

Example embodiments of the inventive concept relate to electronic devices, and to flexible display devices.

2. Description of the Related Art

A flexible display device has been recently developed, and can be bent and/or folded by using a flexible substrate or film that is made of a bendable material, such as a plastic. Such a flexible display device, or a bent (curved) display device, includes a flat display area, and a flexible display area (or a bent display area) corresponding to a flexible display panel.

A typical flexible display device has the same number of pixel rows in the flat display area as in the flexible/bent display area. In addition, as a resolution (or PPI (pixel per inch)) of the display device increases, the number of pixels per area increases. However, an increase in pixel density may cause an increase in leakage current due to contact of wirings and/or circuit elements. Thus, it may be difficult to reduce a radius of curvature at the flexible/bent display area.

SUMMARY

Example embodiments provide a flexible display device including a main display area and a sub display area, which have different resolutions.

According to example embodiments, a flexible display device includes a display panel including a main display area including a plurality of main pixel rows, and a sub display area at a side of the main display area and including a plurality of sub pixel rows, a scan driving circuit configured to provide scan signals to the main pixel rows via a plurality of main scan lines, and provide the scan signals to the sub pixel rows via a plurality of sub scan lines, a data driving circuit configured to provide data signals to a plurality of pixels respectively located in the main pixel rows and the sub pixel rows, and a timing controller configured to control the scan driving circuit and the data driving circuit, wherein a number of the sub pixel rows is less than a number of the main pixel rows.

Line pitches between adjacent ones of the sub pixel rows may be greater than line pitches between adjacent ones of the main pixel rows.

The main display area may correspond to a flat display area.

The sub display area may correspond to a bent display area.

The sub display area may correspond to a foldable display area.

The sub display area may correspond to a rollable display area.

One of the scan signals applied to a (J)-th main pixel row of the main pixel rows may be substantially the same as another one of the scan signals applied to a (L)-th sub pixel row of the sub pixel rows, the (L)th sub pixel row and the (J)-th main pixel row being at substantially a same row, where J and L are positive integers.

The scan driving circuit may be between the main display area and the sub display area.

A number of the sub pixel rows may be half a number of the main pixel rows.

The sub scan lines may respectively correspond to odd-numbered main scan lines of the main scan lines.

The sub scan lines may respectively correspond to even-numbered main scan lines of the main scan lines.

The flexible display device may further include an emission driving circuit configured to provide emission control signals to the main pixel rows via a plurality of main emission control lines, and to provide the emission control signals to the sub pixel rows via a plurality of sub emission control lines.

One of the emission signals applied to a (J)-th main pixel row of the main pixel rows may be substantially the same as another one of the emission control signals applied to a (L)-th sub pixel row of the sub pixel rows, the (L)-th sub pixel row and the (J)-th main pixel row being at substantially a same row, where J and L are positive integers.

The emission driving circuit may be between the main display area and the sub display area.

According to example embodiments, a flexible display device includes a display panel including a main display area including a plurality of main pixel rows, and a sub display area at both sides of the main display area and including a plurality of sub pixel rows, a scan driving circuit configured to provide scan signals to the main pixel rows and to the sub pixel rows, an emission driving circuit configured to provide emission control signals to the main pixel rows and to the sub pixel rows, a data driving circuit configured to provide data signals to the main pixel rows and to the sub pixel rows, and a timing controller configured to control the scan driving circuit, the data driving circuit, and the emission driving circuit, wherein a number of the sub pixel rows is less than a number of the main pixel rows.

Line pitches between adjacent ones of the sub pixel rows may be greater than line pitches between adjacent ones of the main pixel rows.

The main display area may correspond to a flat display area, and the sub display area may correspond to a flexible display area.

The sub display area may include a first sub display area at a left side of the main display area; and a second sub display area at a right side of the main display area.

A number of left sub pixel rows of the first sub display area may be the same as a number of right sub pixel rows of the second sub display area.

A number of left sub pixel rows of the first sub display area may be different from a number of right sub pixel rows of the second sub display area.

Therefore, the number of sub pixel rows included in the flexible or bent display area of the flexible display device, according to example embodiments, may be less than the number of the main pixel rows in the main display area, such that spaces or line pitches between the sub pixel rows may increase. Thus, defects, such as current leakage, line short, line open, etc., which may be caused by folding or bending area of the display panel, may be reduced, and thus, various radius of curvature or various shapes at the sub display area can be designed.

BRIEF DESCRIPTION OF THE DRAWINGS

Example embodiments can be understood in more detail from the following description taken in conjunction with the accompanying drawings, in which.

DETAILED DESCRIPTION

Figure 1:
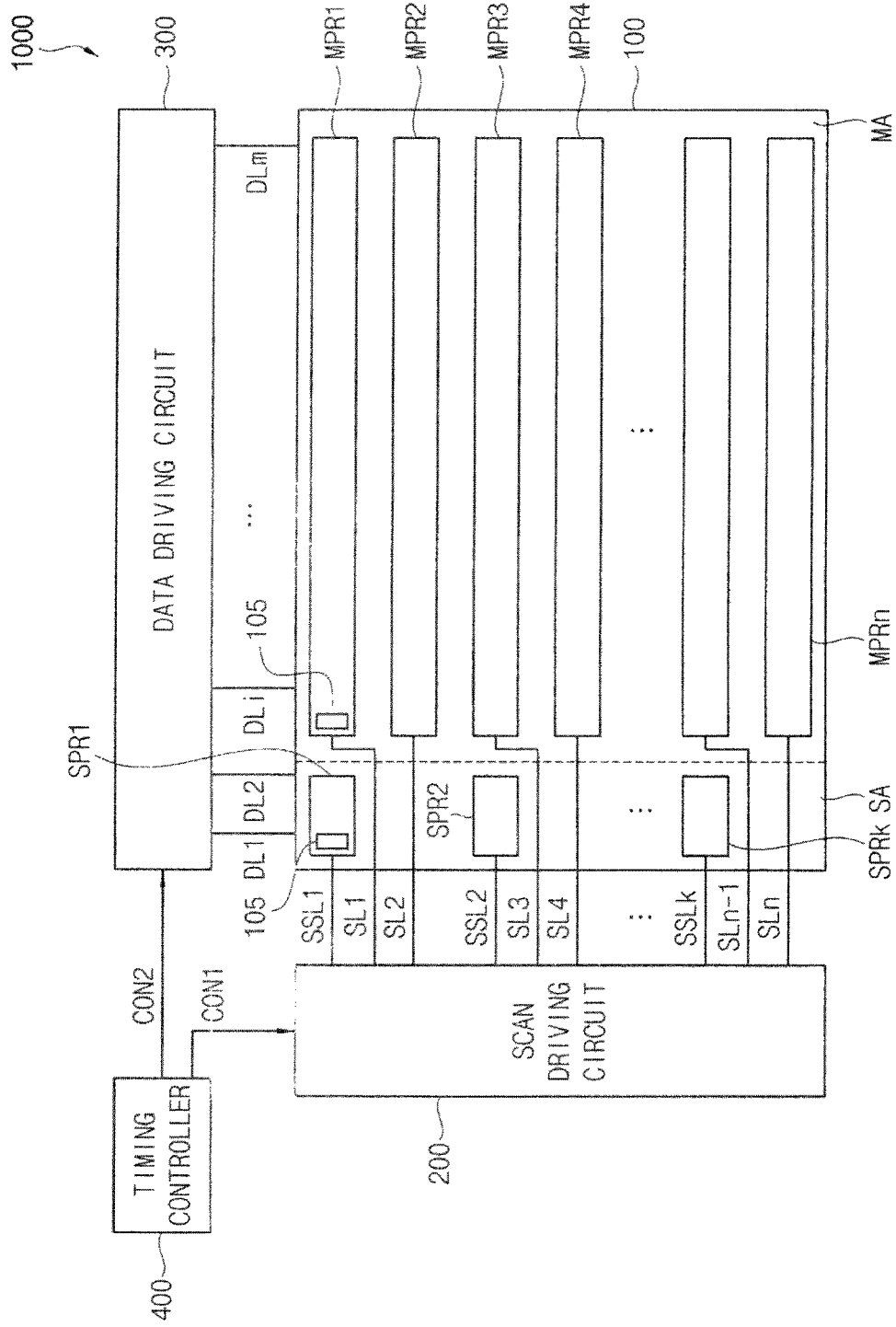
FIG. 1 is a block diagram of a flexible display device according to example embodiments.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
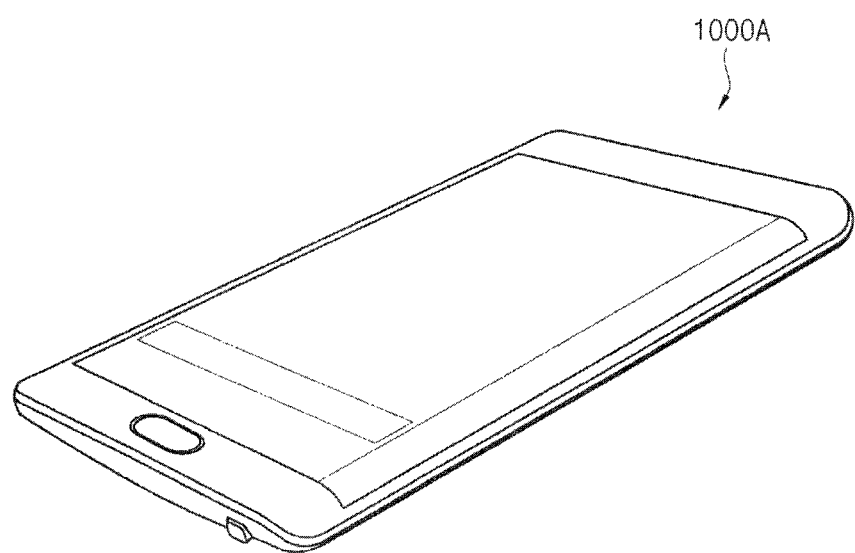
FIG. 2 is a diagram illustrating an example of the flexible display device of FIG. 1.

FIG. 1 is a block diagram of a flexible display device according to example embodiments, and FIG. 2 is a diagram illustrating an example of the flexible display device of FIG. 1.

Referring to FIGS. 1 and 2, the flexible display device 1000 may include a display panel 100, a scan driving circuit 200, a data driving circuit 300, and a timing controller 400. The flexible display device 1000 may further include an emission driving circuit.

In some embodiments, the flexible display device 1000 may include a rigid display area and a flexible display area. For example, the flexible display area may be bendable, foldable, or rollable. In some embodiments, the flexible display device 1000 may include a flat display area and a bent (or curved) display area.

The display panel 100 may include a plurality of pixels 105. The display panel 100 may be connected to the scan driving circuit 200 via a plurality of main scan lines SL1 to SLn and via a plurality of sub scan lines SSL1 to SSLk. The display panel 100 may be connected to the data driving circuit 300 via a plurality of data lines DL1 to DLm.

The display panel 100 may include a main display area MA having a plurality of main pixel rows MPR1 to MPRn, and may include a sub display area SA having a plurality of sub pixel rows SPR1 to SPRk. The sub display area SA may be at a side of the main display area MA. The main pixel rows MPR1 to MPRn and the sub pixel rows SPR1 to SPRk may include a plurality of pixels 105. The number of pixels 105 in each of the sub pixel rows SPR1 to SPRk may be less than the number of pixels 105 in each of the main pixel rows MPR1 to MPRn. In some embodiments, each of the pixels 105 may include an organic light emitting diode.

The main display area MA may correspond to a flat display area. For example, the main display area MA may be in the rigid display area. First to (N)-th main pixel rows MPR1 to MPRn may be respectively connected to first to (N)-th main scan lines SL1 to SLn.

The sub display area SA may correspond to the flexible display area. For example, the sub display area SA may be in the flexible display area or in the bent (or curved) display area. In one embodiment, the sub display area SA may correspond to a bent display area. In one embodiment, the sub display area SA may correspond to a foldable display area. In one embodiment, the sub display area SA may correspond to a rollable display area. First to (K)-th sub pixel rows SPR1 to SPRk may be respectively connected to first to (K)-th sub scan lines SSL1 to SSLk. Here, k is a positive integer that is less than n. Accordingly, the number of the sub pixel-rows SPR1 to SPRk may be less than the number of main pixel rows MPR1 to MPRn. Thus, resolution, or pixels per Inch (PPI), of the sub display area SA may be less than the resolution of the main display area MA. In one embodiment, the number of the sub pixel rows SPR1 to SPRk may be half the number of main pixel rows MPR1 to MPRn. For example, the main display area MA may have a quad high definition (QHD) image quality, and the sub display area SA may have a full high definition (FHD) image quality. Because these are examples, the number of the sub pixel rows SPR1 to SPRk, the PPI of the main display area MA, and the PPI of the sub display area SA are not limited thereto.

The sub display area SA may be driven independently from the main display area MA by the scan signals applied through the first to (K)-th sub scan lines SSL1 to SSLk. For example, an image may be displayed on only the main display area MA while not being displayed on the sub display area SA.

In some embodiments, line pitches (or line spacing) between each of the sub pixel rows SPR1 to SPRk may be greater than line pitches between each of the main pixel rows MPR1 to MPRn. For example, as illustrated in FIG. 1, the sub pixel rows SPR1 to SPRk may be respectively arranged on the substantially the same rows as odd-number scan lines MPR1, MPR3, . . . . For example, the first sub pixel row SPR1 and the first main pixel row MPR1 may be arranged on substantially the same row, and the second sub pixel row SPR2 and the third main pixel row MPR3 may be arranged on substantially the same row. The line pitches between each respective pair of the sub pixel rows SPR1 to SPRk may be substantially the same, or some of the line pitches between each respective pair of the sub pixel rows SPR1 to SPRk may be substantially the same. Because the line pitches between the sub pixel rows SPR1 to SPRk are relatively increased, spaces between adjacent internal elements in the sub display area SA may correspondingly increase. Thus, various curvatures at the sub display area SA may be implemented.

In some embodiments, as illustrated in FIG. 2, the flexible display device 1000A may include the flat display area and the bent (or curved) display area. The bent display area may be at one or more sides of the flat display area. Because this is an example, the bent display area may instead be the rollable area or the foldable area. In addition, the shapes of the flexible display device are not limited thereto.

The scan driving circuit 200 may provide scan signals to the main pixel rows MPR1 to MPRn via the main scan lines SL1 to SLn, respectively, and may provide scan signals to the sub pixel rows SPR1 to SPRk via the sub scan lines SSL1 to SSLk, respectively, based on a first control signal CON1. In one embodiment, one of the scan signals applied to a (J)-th main pixel row of the main pixel rows MPR1 to MPRn may be substantially the same as another one of the scan signals applied to a (L)-th sub pixel row of the sub pixel rows SPR1 to SPRk. Here, the (L)th sub pixel row and the (J)-th main pixel row may be arranged on substantially the same row, where J is a positive integer less than or equal to n, and L is a positive integer less than or equal to k. For example, a first scan signal may be concurrently applied to the first main pixel row MPR1 and the first sub pixel row SPR1, and a third scan signal may be concurrently applied to the third main pixel row MPR3 and the second sub pixel row SPR2. In one embodiment, the sub scan lines SSL1 to SSLk may respectively correspond to odd-numbered main scan lines SL1, SL3, . . . of the main scan lines SL1 to SLn. In one embodiment, the sub scan lines SSL1 to SSLk may correspond to even-numbered main scan lines SL2, SL4, . . . of the main scan lines SL1 to SLn.

The data driving circuit 300 may provide data signals to the pixels 105 included in the main pixel rows MPR1 to MPRn and in the sub pixel rows SPR1 to SPRk via the data lines DL1 to DLm based on a second control signal CON2.

The timing controller 400 may generate the first and second control signals CON1 and CON2, and may control the scan driving circuit 200 and the data driving circuit 300.

As described above, the number of sub pixel rows SPR1 to SPRk included in the flexible or bent display area (e.g., the sub display area SA) of the flexible display device 1000 is less than the number of the main pixel rows MPR1 to MPRn in the main display area MA such that spaces, or line pitches, between adjacent ones of the sub pixel rows SPR1 to SPRk may increase (e.g., relative to spaces, or line pitches, between adjacent ones of the main pixel rows MPR1 to MPRn). Thus, defects such as current leakage, line short, line open, etc. otherwise created by folding or bending of the display panel 100 may be reduced, and thus, various radius of curvature or various shapes at the sub display area SA can be designed.

Figure 3:
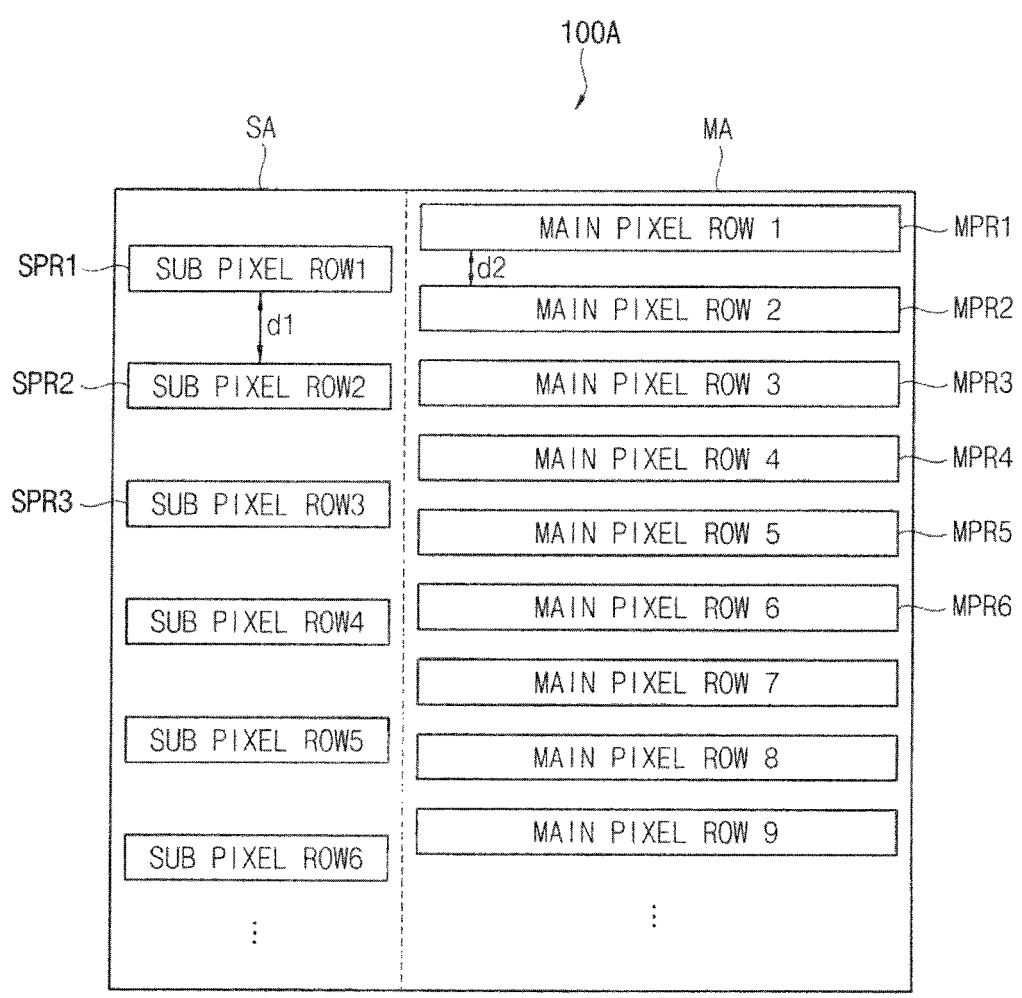
FIG. 3 is a diagram illustrating an example of a display panel included in the flexible display device of FIG. 1.
Figure 4:
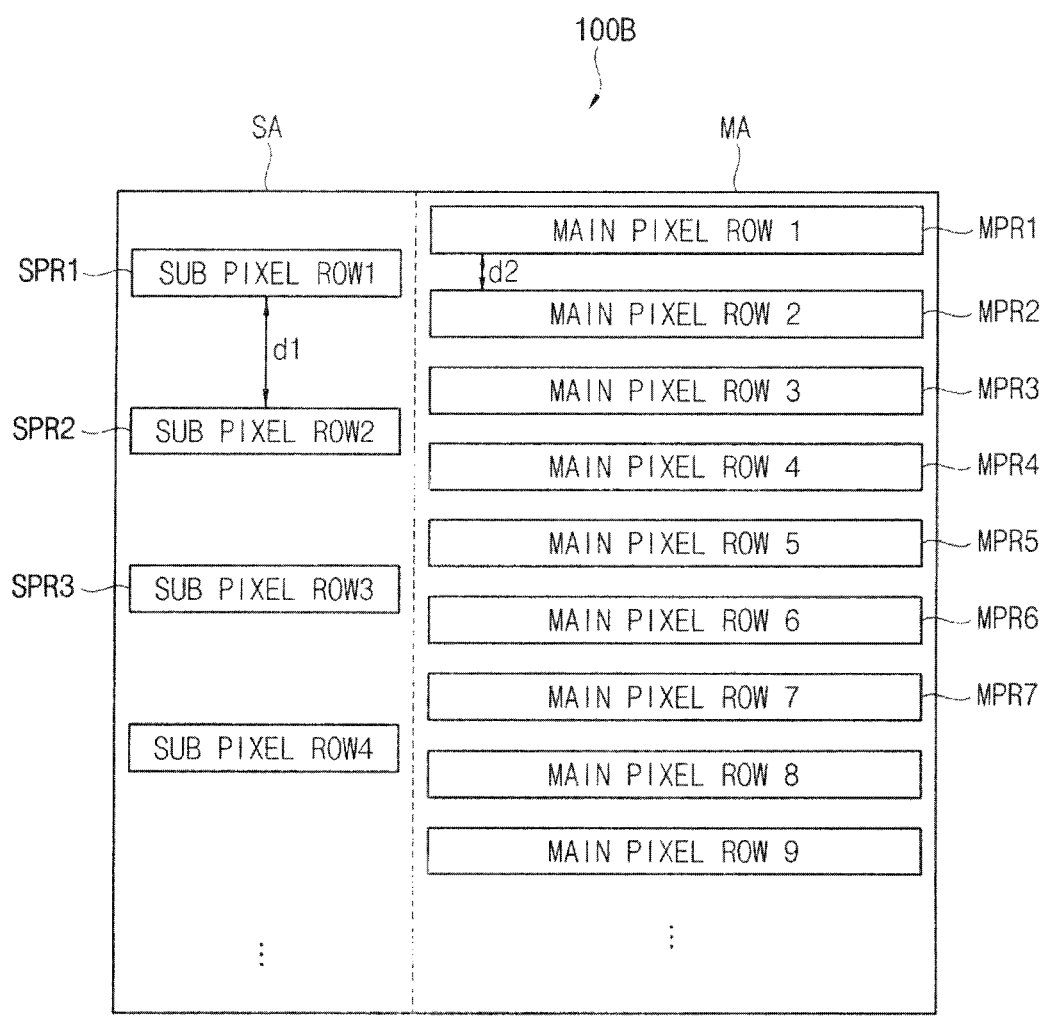
FIG. 4 is a diagram illustrating another example of a display panel included in the flexible display device of FIG. 1.
Figure 5:
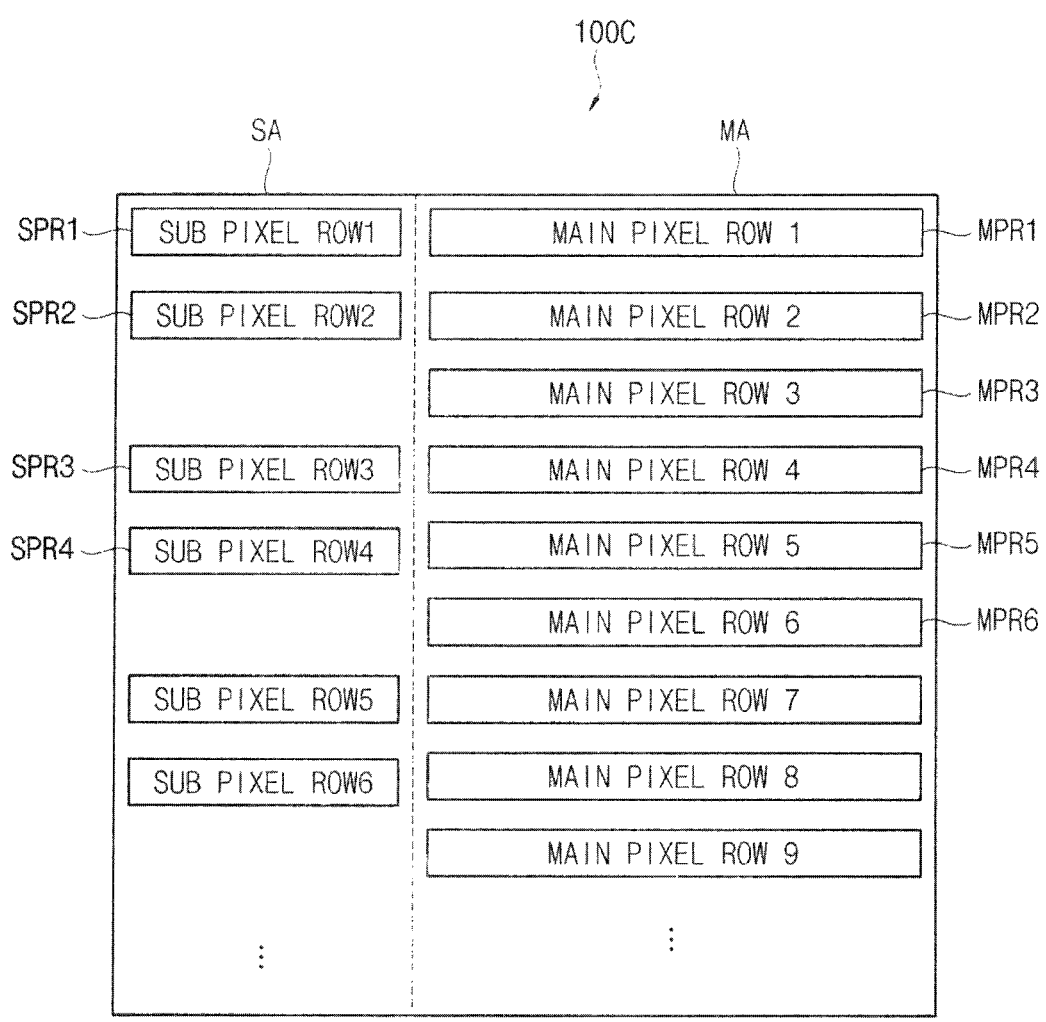
FIG. 5 is a diagram illustrating still another example of a display panel included in the flexible display device of FIG. 1.

FIG. 3 is a diagram illustrating an example of a display panel included in the flexible display device of FIG. 1, FIG. 4 is a diagram illustrating another example of a display panel included in the flexible display device of FIG. 1, and FIG. 5 is a diagram illustrating still another example of a display panel included in the flexible display device of FIG. 1.

Referring to FIGS. 3 to 5, the display panel 100A, 100B, and 100C may include a main display area MA and a sub display area SA. The main display area MA may include a plurality of main pixel rows MPR1, MPR2, . . . . The sub display area SA may include a plurality of sub pixel rows SPR1, SPR2, . . . .

The main display area MA may correspond to a flat display area. The sub display area SA may correspond to a flexible display area or a bent display area. The sub display area SA may be at a side of the main display area MA. For example, the sub display area SA may be at a left side, or at a right side, of the main display area MA.

The main pixel rows MPR1, MPR2, . . . and the sub pixel rows SPR1, SPR2, . . . may include a plurality of pixels, respectively. In some embodiments, the number of the pixels in each of the sub pixel rows SPR1, SPR2, . . . may be less than or equal to the number of the pixels in each of the main pixel rows MPR1, MPR2, . . . .

As illustrated in FIG. 3, a line pitch (or a space) d1 between the sub pixel rows SPR1 and SPR2 may be greater than a line pitch d2 between the main pixel rows MPR1 and MPR2, . . . . For example, a ratio of a number of main pixel rows of the display panel 100A to a number of sub pixel rows of the display panel 100A may correspond to about 5:3. Thus, the number of the sub pixel rows SPR1, SPR2, . . . may correspond to about 60% of the number of the main pixel rows MPR1, MPR2, . . . . Here, it is not necessary that the sub pixel rows SPR1, SPR2, . . . to be collinear to main pixel rows MPR1 and MPR2, . . . .

As illustrated in FIG. 4, the number of the sub pixel rows SPR1, SPR2, . . . may be half the number of the main pixel rows MPR1 and MPR2, . . . . For example, the sub pixel rows SPR1, SPR2, . . . may be collinear to even-numbered main pixel rows MPR2, MPR4, . . . . Here, sub scan lines connected to the sub pixel rows SPR1, SPR2, . . . may correspond to even-numbered main scan lines connected to the main pixel rows MPR2, MPR4, . . . , respectively. Thus, the same scan signal may be provided to a main scan line and a corresponding sub scan line. Accordingly, additional circuits for providing scan signals to the sub display area SA may be omitted in the scan driving circuit 200. Here, the number of the sub pixel rows SPR1, SPR2, . . . may correspond to about 50% of the number of the main pixel rows MPR1, MPR2, . . . . In one embodiment, as illustrated in FIG. 4, it is not necessary that the sub pixel rows SPR1, SPR2, . . . to be collinear to main pixel rows MPR1 and MPR2, . . . .

As illustrated in FIG. 5, the ratio of the number of main pixel rows MPR1, MPR2, . . . to the number of sub pixel rows SPR1, SPR2, . . . of the display panel 100A may correspond to about 3:2. For example, the sub pixel rows SPR1, SPR2, . . . may be collinear to (3K−1)-th main pixel rows and (3K−2)-th main pixel rows, respectively. Thus, the number of the sub pixel rows SPR1, SPR2, . . . may correspond to about 67% of the number of the main pixel rows MPR1, MPR2, . . . . Here, the line pitches between adjacent ones of the sub pixel rows SPR1, SPR2, . . . may be different. For example, the line pitch between the first sub pixel row SPR1 and the second sub pixel row SPR2 may be less than the line pitch between the second sub pixel row SPR2 and the third sub pixel row SPR3. In one embodiment, one of the scan signals applied to a (J)-th main pixel row of the main pixel rows MPR1 to MPRn may be substantially the same as another one of the scan signals applied to a (L)-th sub pixel row of the sub pixel rows SPR1 to SPRk. Here, the (L)th sub pixel row and the (J)-th main pixel row may be arranged on substantially the same row (or may be collinear). Accordingly, additional circuits for providing scan signals to the sub display area SA may be omitted in the scan driving circuit 200.

As described above, the number of sub pixel rows SPR1, SPR2, . . . included in the flexible or bent display area (e.g., the sub display area SA) is less than the number of the main pixel rows MPR1, MPR2, . . . in the main display area MA, such that the spaces or the line pitches d1 between the sub pixel rows SPR1 to SPRk may increase. Thus, various curvatures or various shapes at the sub display area SA may be implemented.

Figure 6:
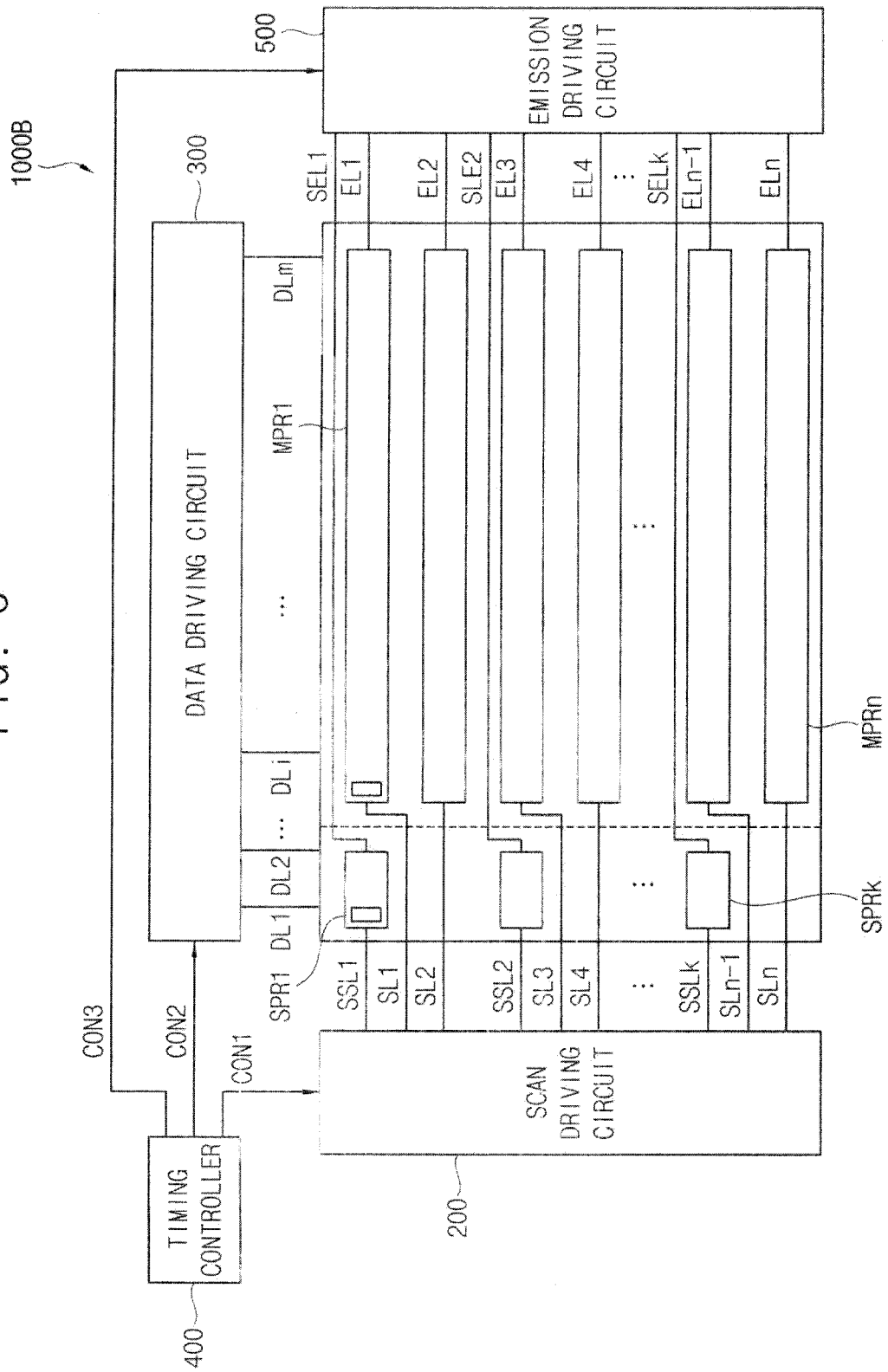
FIG. 6 is a block diagram illustrating an example of the flexible display device of FIG. 1.

FIG. 6 is a block diagram illustrating an example of the flexible display device of FIG. 1.

In FIG. 6, like reference numerals are used to designate like elements of the flexible display device in FIG. 1, and detailed description of these elements may be omitted. The flexible display device of FIG. 6 may be substantially the same as, or similar to, the flexible display device of FIG. 1, except for the addition of an emission driving circuit 500.

Referring to FIG. 6, the flexible display device 1000B may include a display panel 100, a scan driving circuit 200, a data driving circuit 300, a timing controller 400, and an emission driving circuit 500.

The display panel 100 may be connected to the scan driving circuit 200 via a plurality of main scan lines SL1 to SLn and a plurality of sub scan lines SSL1 to SSLk. The display panel 100 may be connected to the emission driving circuit 500 via a plurality of main emission control lines EL1 to ELn and a plurality of sub emission control lines SEL1 to SELk. The display panel 100 may be connected to the data driving circuit 300 via a plurality of data lines DL1 to DLm. The display panel 100 may include a main display area MA having a plurality of main pixel rows MPR1 to MPRn, and may include a sub display area SA having a plurality of sub pixel rows SPR1 to SPRk. The sub display area SA may be at a side of the main display area MA. The main pixel rows MPR1 to MPRn and the sub pixel rows SPR1 to SPRk may include a plurality of pixels.

The main display area MA may correspond to a flat display area. For example, the main display area MA may be in the rigid display area. First to (N)-th main pixel rows MPR1 to MPRn may be respectively connected to first to (N)-th main scan lines SL1 to SLn, and to first to (N)-th main emission control lines EL1 to ELn.

The sub display area SA may correspond to a flexible display area. First to (K)-th sub pixel rows SPR1 to SPRk may be respectively connected to first to (K)-th sub scan lines SSL1 to SSLk, and to first to (K)-th sub emission control lines SEL1 to SELk. Here, k is a positive integer that is less than n. Accordingly, the number of the sub pixel-rows SPR1 to SPRk may be less than the number of main pixel rows MPR1 to MPRn. Thus, resolution, or pixels per inch (PPI), of the sub display area SA may be less than the resolution or PPI of the main display area MA.

Line pitches (or line spacing) between the sub pixel rows SPR1 to SPRk may be greater than line pitches between the main pixel rows MPR1 to MPRn. It is not necessary that all of the line pitches of the sub pixel rows SPR1 to SPRk are the same. Because the line pitches between each of the sub pixel rows SPR1 to SPRk are relatively increased, spaces between adjacent internal elements in the sub display area SA may increase. Thus, various curvatures at the sub display area SA may be implemented.

The scan driving circuit 200 may provide scan signals to the main pixel rows MPR1 to MPRn via the main scan lines SL1 to SLn, and to the sub pixel rows SPR1 to SPRk via the sub scan lines SSL1 to SSLk, based on a first control signal CON1. In one embodiment, one of the scan signals applied to a (J)-th main pixel row of the main pixel rows MPR1 to MPRn may be substantially the same as another one of the scan signals applied to a (L)-th sub pixel row of the sub pixel rows SPR1 to SPRk. Here, the (L)th sub pixel row and the (J)-th main pixel row may be at substantially the same row, where J is a positive integer that is less than or equal to n, and L is a positive integer less than or equal to k.

The data driving circuit 300 may provide data signals to the pixels included in the main pixel rows MPR1 to MPRn and in the sub pixel rows SPR1 to SPRk via the data lines DL1 to DLm based on a second control signal CON2.

The emission driving circuit 500 may provide emission control signals to the main pixel rows MPR1 to MPRn via the main emission control lines EL1 to ELn, and to the sub pixel rows SPR1 to SPRk via the sub emission control lines SEL1 to SELk, based on a third control signal CON3. Each of the emission control signals may be a signal for controlling emission of the pixel rows. In one embodiment, one of the emission control signals applied to the (J)-th main pixel row may be substantially the same as another one of the emission control signals applied to the (L)-th sub pixel row. The main emission control lines EL1 to ELn may be respectively connected to the main pixel rows MPR1 to MPRn. The sub emission control lines SEL1 to SELk may be respectively connected to the sub pixel rows SPR1 to SPRk.

The timing controller 400 may generate the first, second, and third control signals CON1, CON2, and CON3, and may control the scan driving circuit 200, the data driving circuit 300, and the emission driving circuit 500.

In one embodiment, the scan driving circuit 200 and the emission driving circuit 500 may be at one or more sides of the display panel 100. In one embodiment, at least one of the scan driving circuit 200 and the emission driving circuit 500 may be between the main display area MA and the sub display area SA.

Figure 7:
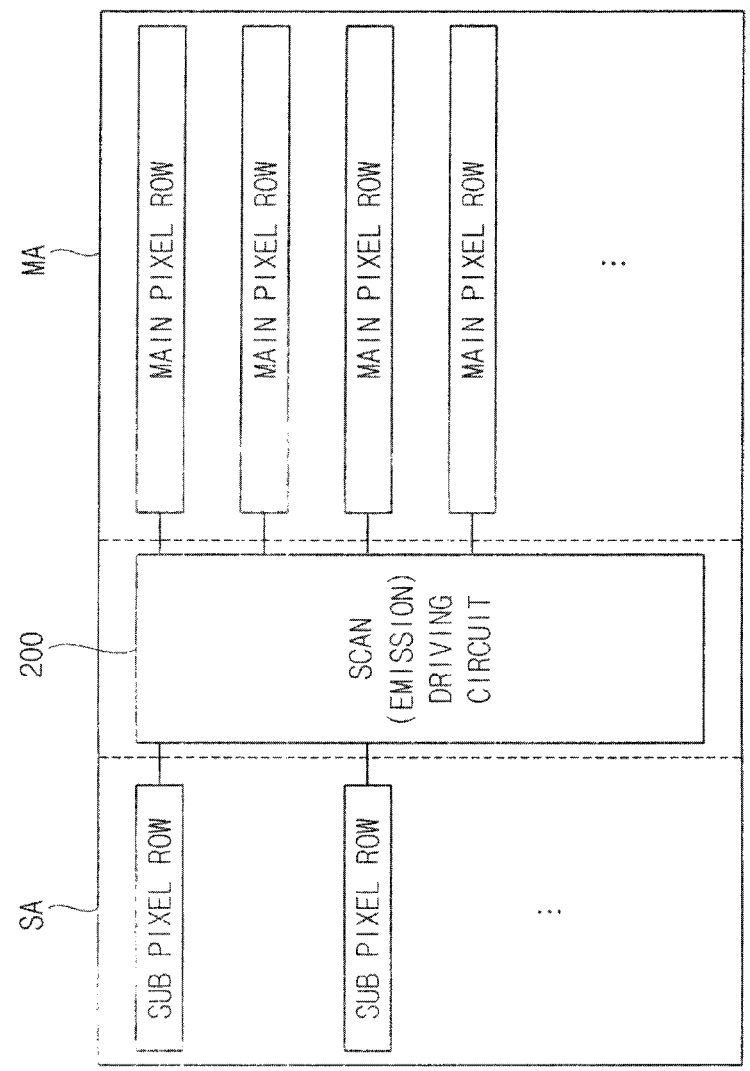
FIG. 7 is a diagram illustrating an example of an arrangement of a scan driving circuit included in the flexible display device of FIG. 1.

FIG. 7 is a diagram illustrating an example of an arrangement of a scan driving circuit included in the flexible display device of FIG. 1.

Referring to FIG. 7, the scan driving circuit 200 may be implemented by an embedded integrated circuit in the display panel. For example, an emission driving circuit may be further implemented by the embedded integrated circuit in the display panel.

In one embodiment, the scan driving circuit 200 may be between a main display area MA and a sub display area SA. Thus, main scan lines may be connected to main pixel rows, and sub scan lines may be connected to sub pixel rows. Further, the emission driving circuit (e.g., the emission driving circuit 500) may also be between the main display area MA and the sub display area SA. Thus, main emission control lines may be connected to the main pixel rows, and sub emission control lines may be connected to the sub pixel rows.

Accordingly, defects, such as current leakage, line short, line open, etc. otherwise caused by folding or bending area of the display panel may be reduced.

Figure 8:
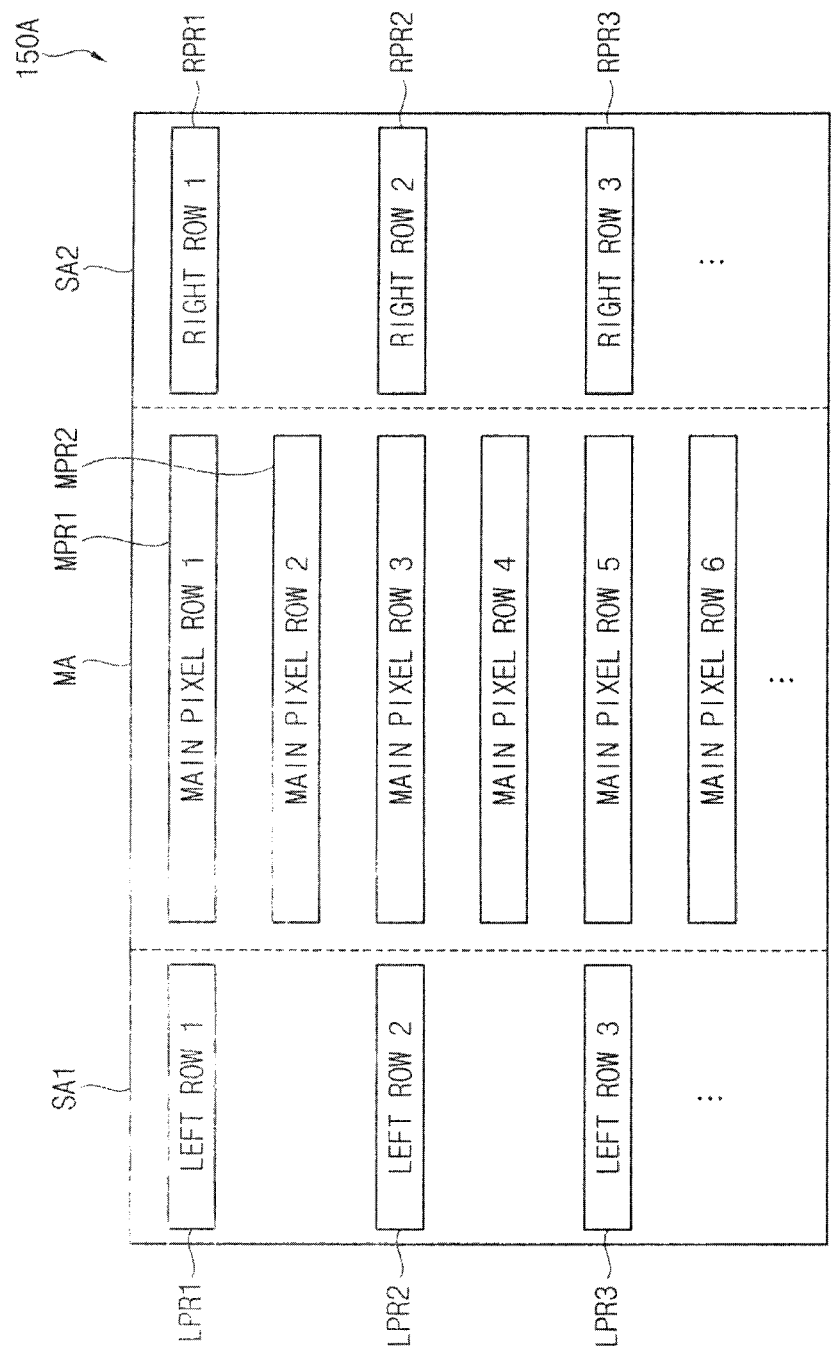
FIG. 8 is a diagram of a display panel included in a flexible display device according to example embodiments.
Figure 9:
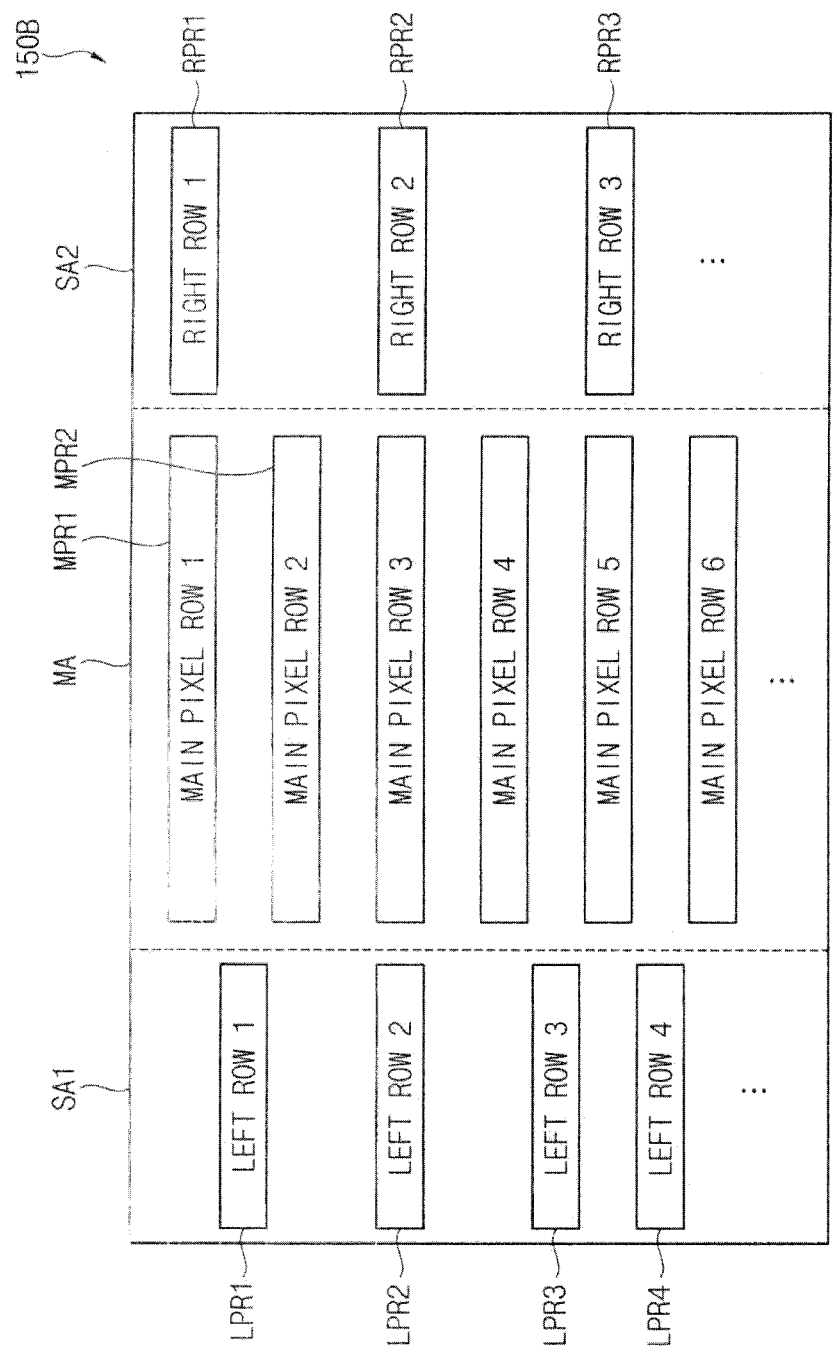
FIG. 9 is a diagram illustrating an example of a display panel included in the flexible display device of FIG. 8.

FIG. 8 is a diagram of a display panel included in a flexible display device according to example embodiments, and FIG. 9 is a diagram illustrating an example of a display panel included in the flexible display device of FIG. 8.

Referring to FIGS. 8 and 9, the display panel 150A and 150B included in the flexible display device may include a main display area MA and a sub display area SA1 and SA2.

The flexible display device may further include a scan driving circuit, a data driving circuit, an emission driving circuit, and a timing controller. Because these are described above with reference to FIGS. 1 and 6, duplicate descriptions will not be repeated.

The main display area MA may include a plurality of main pixel rows MPR1, MPR2, . . . . The main display area MA may correspond to a flat display area.

The sub display area SA1 and SA2 may be respectively at each of the sides of the main display area MA. The sub display area SA1 and SA2 may correspond to a flexible display area and/or a bent display area. The sub display area SA1 and SA2 may include a plurality of sub pixel rows. In one embodiment, the sub display area SA1 and SA2 may include a first sub display area SA1 at a left side of the main display area MA, and a second sub display area SA2 at a right side of the main display area MA.

Left sub pixel rows LPR1, LPR2, . . . may be included in the first sub display area SA1. The number of the left sub pixel rows LPR1, LPR2, . . . may be less than the number of the main pixel rows MPR1, MPR2, . . . . For example, the number of the left sub pixel rows LPR1, LPR2, . . . may be half the number of the main pixel rows MPR1, MPR2, . . . . Thus, line pitches (or spacing) of the left sub pixel rows LPR1, LPR2, . . . may be greater than the line pitches of the main pixel rows MPR1, MPR2, . . . .

Right sub pixel rows RPR1, RPR2, . . . may be included in the second sub display area SA2. The number of the right sub pixel rows RPR1, RPR2, . . . may be less than the number of the main pixel rows MPR1, MPR2, . . . . Thus, the line pitches of the right sub pixel rows RPR1, RPR2, . . . may be greater than the line pitches of the main pixel rows MPR1, MPR2, . . . .

In one embodiment, as illustrated in FIG. 8, the number of the left sub pixel rows LPR1, LPR2, . . . may be the same as the number of the right sub pixel rows RPR1, RPR2, . . . . Here, the left sub pixel rows LPR1, LPR2, . . . and the corresponding right sub pixel rows RPR1, RPR2, . . . may be collinear, respectively. Because this is an example, arrangements of the sub pixel rows are not limited thereto. For example, the left sub pixel rows LPR1, LPR2, . . . and the right sub pixel rows RPR1, RPR2, . . . might not be collinear. In addition, the line pitches of the right sub pixel rows RPR1, RPR2, . . . may be different from the line pitches of the left sub pixel rows LPR1, LPR2, . . . .

In one embodiment, as illustrated in FIG. 9, the number of the left sub pixel rows LPR1, LPR2, . . . may be different from the number of the right sub pixel rows RPR1, RPR2, . . . . For example, the number of the left sub pixel rows LPR1, LPR2, . . . may correspond to about 67% (e.g., ⅔rds) of the number of the main pixel rows MPR1, MPR2, . . . , and the number of the right sub pixel rows RPR1, RPR2, . . . may correspond to about 50% of the number of the main pixel rows MPR1, MPR2, . . . . In the present embodiment, a curvature of the second sub display area SA2 including the right sub pixel rows RPR1, RPR2, . . . may be less than a curvature of the first sub display area SA1 including the left sub pixel rows LPR1, LPR2, . . . .

As described above, the number of sub pixel rows LPR1, LPR2, . . . and RPR1, RPR2, . . . included in the flexible or bent display area of the flexible display device may be less than the number of the main pixel rows MPR1, MPR2, . . . in the main display area MA, such that spaces or line pitches between the sub pixel rows may be relatively larger. Thus, defects, such as current leakage, line short, line open, etc. otherwise caused by folding or bending of the display panel 150A and 150B may be reduced or eliminated, and thus, various curvatures or various shapes at the sub display area SA1 and SA2 may be designed.

Figure 10:
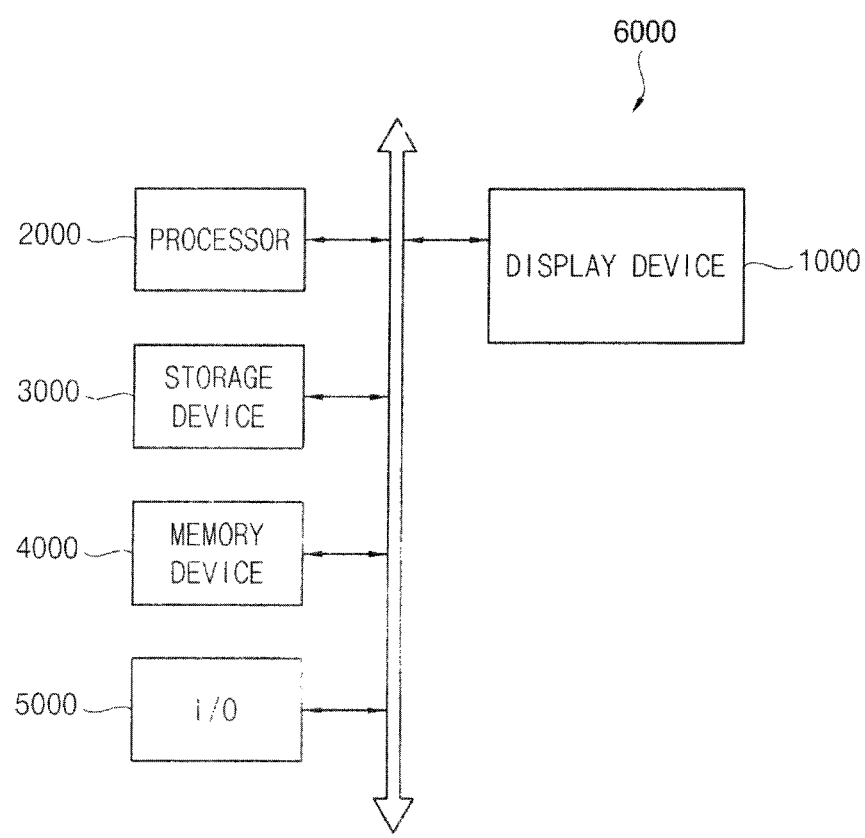
FIG. 10 is a block diagram of an electronic device according to example embodiments.

FIG. 10 is a block diagram of an electronic device according to example embodiments.

Referring to FIG. 10, the electronic device 6000 may include a flexible display device 1000, a processor 2000, a storage device 3000, a memory device 4000, and an input/output (I/O) device 5000. Here, the flexible display device 1000 may correspond to the flexible display device of FIG. 1 or of FIG. 6. In addition, the electronic device 6000 may further include a plurality of ports for communicating with a video card, a sound card, a memory card, a universal serial bus (USB) device, other suitable electronic devices, etc.

The processor 2000 may perform various suitable computing functions. The processor 2000 may be a microprocessor, a central processing unit (CPU), etc. The processor 2000 may be coupled to other suitable components via an address bus, a control bus, a data bus, etc. Furthermore, the processor 2000 may be coupled to an extended bus such as a peripheral component interconnection (PCI) bus.

The storage device 3000 may store data for operations of the electronic device 6000. The storage device 3000 may be a solid state drive (SSD) device, a hard disk drive (HDD) device, a CD-ROM device, etc.

The memory device 4000 may also store data for operations of the electronic device 6000. For example, the memory device 4000 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc.

The I/O device 5000 may be an input device such as a keyboard, a keypad, a touchpad, a touch-screen, a mouse, etc., and an output device such as a printer, a speaker, etc.

The flexible display device 1000 may be connected to other elements via the buses or other communication links. According to some example embodiments, the flexible display device 1000 may be included in the I/O device 5000. As described above, the flexible display device 1000 may include a display panel including a main display area and a sub display area, a data driving circuit configured to apply data signals to the display panel, a scan driving circuit configured to apply scan signals to the display panel, an emission driving circuit configured to apply emission control signals to the display panel, and a timing controller configured to control the data driving circuit, the scan driving circuit, and the emission driving circuit.

The main display area may correspond to a flat display area and the sub display area may correspond to a flexible or a bent display area. The number of sub pixel-rows included in the sub pixel area may be less than the number of main pixel rows included in the main pixel area. In addition, line pitches (or line spacing) between each of the sub pixel rows may be greater than line pitches (or line spacing) between each of the main pixel rows.

Accordingly, defects, such as current leakage, line short, line open, etc. by folding or bending area of the display panel may be reduced, and thus, various curvatures or various shapes at the sub display area SA can be designed.

The present embodiments may be applied to any flexible or curved display device and any system including the display device. For example, the present embodiments may be applied to a television, a computer monitor, a laptop, a digital camera, a cellular phone, a smart phone, a smart pad, a personal digital assistant (PDA), a portable multimedia player (PMP), a MP3 player, a navigation system, a game console, a video phone, etc.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:
1. A flexible display device comprising:
    a display panel comprising:
        a main display area comprising a plurality of main pixel rows; and
        a sub display area at a side of the main display area and comprising a plurality of sub pixel rows;
    a scan driving circuit configured to:
        provide scan signals to the main pixel rows via a plurality of main scan lines; and
        provide the scan signals to the sub pixel rows via a plurality of sub scan lines;
    a data driving circuit configured to provide data signals to a plurality of pixels respectively located in the main pixel rows and the sub pixel rows; and
    a timing controller configured to control the scan driving circuit and the data driving circuit,
    wherein a number of the sub pixel rows is less than a number of the main pixel rows and
    wherein a same scan signal applied to a (J)-th main pixel row of the main pixel rows is applied to a (L)-th sub pixel row of the sub pixel rows, J and L being different respective positive integers.
2. The flexible display device of claim 1, wherein line pitches between adjacent ones of the sub pixel rows are greater than line pitches between adjacent ones of the main pixel rows.
3. The flexible display device of claim 2, wherein the main display area corresponds to a flat display area.
4. The flexible display device of claim 3, wherein the sub display area corresponds to a bent display area.
5. The flexible display device of claim 3, wherein the sub display area corresponds to a foldable display area.
6. The flexible display device of claim 1, wherein the sub display area corresponds to a rollable display area.
7. The flexible display device of claim 1, wherein the scan driving circuit is between the main display area and the sub display area.
8. The flexible display device of claim 1, wherein a number of the sub pixel rows is half a number of the main pixel rows.
9. The flexible display device of claim 8, wherein the sub scan lines respectively correspond to odd-numbered main scan lines of the main scan lines.
10. The flexible display device of claim 8, wherein the sub scan lines respectively correspond to even-numbered main scan lines of the main scan lines.
11. The flexible display device comprising:
    a display panel comprising:
        a main display area comprising a plurality of main pixel rows; and
        a sub display area at a side of the main display area and comprising a plurality of sub pixel rows;
    a scan driving circuit configured to:
        provide scan signals to the main pixel rows via a plurality of main scan lines; and
        provide the scan signals to the sub pixel rows via a plurality of sub scan lines;
    an emission driving circuit configured to:
        provide emission control signals to the main pixel rows via a plurality of main emission control lines; and
        provide the emission control signals to the sub pixel rows via a plurality of sub emission control lines;
    a data driving circuit configured to provide data signals to a plurality of pixels respectively located in the main pixel rows and the sub pixel rows; and
    a timing controller configured to control the scan driving circuit and the data driving circuit,
    wherein a same scan signal applied to a (J)-th main pixel row of the main pixel rows is applied to a (L)-th sub pixel row of the sub pixel rows, J and L being different respective positive integers.
12. The flexible display device of claim 11, wherein one of the emission control signals applied to the (J)-th main pixel row is substantially the same as another one of the emission control signals applied to the (L)-th sub pixel row.
13. The flexible display device of claim 11, wherein the emission driving circuit is between the main display area and the sub display area.

* * * * *